United States Patent [19]
Udd

[11] Patent Number: 5,646,401
[45] Date of Patent: Jul. 8, 1997

[54] FIBER OPTIC GRATING AND ETALON SENSOR SYSTEMS

[76] Inventor: Eric Udd, 2555 NE 205th Ave., Troutdale, Oreg. 97060

[21] Appl. No.: 577,506

[22] Filed: Dec. 22, 1995

[51] Int. Cl.$^6$ ............................................. G01J 9/02
[52] U.S. Cl. ........................ 250/227.18; 250/227.19; 356/345
[58] Field of Search ................ 250/227.14, 227.19, 250/227.18; 356/345, 352, 354

[56] References Cited

U.S. PATENT DOCUMENTS

| | | | |
|---|---|---|---|
| 4,873,989 | 10/1989 | Einzig | 128/692 |
| 5,218,419 | 6/1993 | Lipson et al. | 356/345 |
| 5,380,995 | 1/1995 | Udd et al. | 250/227.18 |
| 5,397,891 | 3/1995 | Udd et al. | 250/227.18 |
| 5,399,854 | 3/1995 | Dunphy et al. | 250/227.17 |
| 5,564,832 | 10/1996 | Ball et al. | 374/161 |

OTHER PUBLICATIONS

M.G. Xu et al., "Multiplexed Point and Stepwise Continuous Fibre Grating Based Sensors: Practical Sensor for Structure Monitoring?" Proc. SPIE, vol. 2294, pp. 69–80, 1994.

W.W. Morrey, "Distributed Fiber Grating Sensors" Proceeding of 7th OFS Conf., pp. 285–288, Sydney, Australia, Dec. 1990.

R.M. Measures et al., "Structurally Integrated Fiber Optic Strain Rosette", Proc. of SPIE, vol. 986, pp. 32–42, 1988.

E. Udd et al., "Application of the Sagnac Interferometer Based Strain Sensor for Earth Movement Detection System", Proc. of SPIE, vol. 2191, pp. 126–136, 1994.

M.G. Xu et al., "Discrimination between strain and temperature effects using dual wavelength fiber gratings", Elec. Letts, vol. 30, pp. 1085–1087, 1994.

*Primary Examiner*—Edward P. Westin
*Assistant Examiner*—Alan L. Giles

[57] ABSTRACT

Fiber optic grating and etalon based fiber sensor systems are described that include an all solid state demodulation system with no moving parts. This demodulation system is based on using interference patterns generated by reflections from fiber gratings or etalons and measurements using an optical detector array. This demodulation system is applied to dual overlaid fiber optic gratings that have been written onto noncircularly symmetric birefringent optical fibers. These fiber grating based sensors may be used to measure transverse strain, longitudinal strain and temperature at a single location simultaneously and their nonsymmetric nature allows accurate placement and alignment of the strain sensing axes in materials.

12 Claims, 8 Drawing Sheets

FIBER OPTIC GRATING AND ETALON SENSOR SYSTEMS

BACKGROUND OF THE INVENTION

There is the need to measure environmental parameters to high accuracy with sensors that are light in weight, nonobtrusive, insensitive to electromagnetic interference and capable of withstanding extreme conditions including wide temperature extremes, large shocks and vibration. Applications for these sensors include the emerging area of smart structures where sensors are used to monitor environmental parameters that are used to augment manufacturing, perform nondestructive evaluation, implement health monitoring systems for structures and augment control systems. These structures need to be able to continuously monitor their condition in real time. They must be able to operate over extremely long times with low power. The sensors used to support these structures must be capable of accurately measuring small changes in environmental signals and still be able to maintain wide dynamic range capabilities.

Fiber optic gratings have been proposed for fiber optic sensors that have the potential to meet many of these requirements. The fiber gratings are constructed by doping the core of an optical fiber with material such as germania. When exposed to light the index of refraction of the optical core of silica based fiber with appropriate core dopants have been observed to have a modified index of refraction. By using phase masks or interfering laser beams it has been demonstrated that it is possible to produce multiple variations in the index of refraction along the length of the fiber core producing an internal grating structure. Adjusting the spacing of the period during formation of the fiber grating changes its spectral transmission and reflection characteristics.

When a fiber grating is exposed to an environmental effect such as strain, temperature, pressure, or vibration the length of the optical fiber is changed and consequently the period of the fiber grating. As an example W. W. Morey reports in "Distributed Fiber Grating Sensors", Proceedings of the Seventh Optical Fiber Sensors Conference, p. 285–288, Sydney, Australia, December 1990 that typical temperature changes are 0.0043 nm/degree C at 833 nm for Andrew PM fiber and 0.0074 nm/degree C for Corning FlexCore fiber at 824 nm. When the fiber is strained the length of the fiber also changes. Bragg wavelength changes were measured by Morey to result in a shift of $5.2 \times 10^{-4}$ nm per microstrain at 820 nm.

For many applications it is necessary to measure both temperature and strain simultaneously. E. Udd and T. E. Clark, in "Fiber Optic Grating Sensor Systems for Sensing Environmental Effects", U.S. Pat. No. 5,380,995 describe how using two overlaid fiber gratings at different wavelengths such as 1.3 and 1.5 microns may be used to measure two environmental parameters such as strain and temperature at a single point. Recently M. G. Xu, H. Geiger and J. P. Dakin, in "Multiplexed Point and Stepwise-Continuous Fibre Grating Based Sensors: Practical Sensor for Structural Monitoring?", Proceedings of SPIE, volume 2294, p. 69–80, 1994 have also demonstrated the simultaneous measurement of strain and temperature using 1.3 and 0.85 microns wavelengths and overlaid fiber gratings for point measurements. In order to make complete measurements of strain internal to a structure it is often necessary to measure all three strain components. R. M. Measures, D. Hogg, R. D. Turner, T. Vails and M. J. Giliberto, in "Structurally Integrated Fiber Optic Strain Rosette", Proceedings of SPIE, volume 986, p. 32–42, 1988 demonstrated a fiber optic strain rosette consisting of three separate fiber sensors. Because these fiber sensors are not collocated and because means to compensate for temperature fluctuation were not employed these rosettes have been of very limited use. There is a continuing need to measure other environmental effects such as transverse strain at a single point and to integrate such fiber grating sensors into practical and economical sensor systems that can be manufactured using available components.

In some situations transverse strain need not be measured and etalon based devices may be used what is needed are low cost, accurate means of measuring such environmental parameters as strain.

BRIEF DESCRIPTION OF THE PRESENT INVENTION

In the present invention sensor systems are constructed using one or more fiber gratings that are used to measure environmental effects, primarily strain, temperature and acoustic pressure so that the sense and magnitude of the environmental effect may be determined. These systems can be used to support health monitoring systems for aircraft, spacecraft, land vehicles, buildings, bridges and other civil structures. They can also be used to support the mechanical testing of materials prior to their incorporation into structures and could be used to measure deformations in natural structures as well to provide data to study earthquakes, slides and other earth movement as reported by E. Udd, R. G. Blom, D. M. Tralli, E. Saaski, and R. Dokka, in "Applications of the Sagnac Interferometer Based Strain Sensor to an Earth Movement Detection System", Proceedings of SPIE, volume 2191, p. 126–136, 1994.

Each of the sensor systems disclosed uses a relatively broadband or scanning light source, one or more fiber gratings and or etalons. The fiber gratings are positioned so that changes in the spectral reflectivity and transmissions of the fiber gratings may be compared to determine environmental effects.

The present system can be used to simultaneously measure and continuously monitor many individual sensors placed along a fiber length. This enables the detection and accurate measurement of both the sense and environmental effect on each sensor.

A normal fiber grating is sensitive to temperature, transverse strain and longitudinal strain effects. Transverse strain effects are particularly important when the fiber sensors are embedded into materials subject to loading such as advanced organic and metallic composite structures. In U.S. Pat. No. 5,380,995 by E. Udd and T. E. Clark a dual overlaid fiber grating operating at two distinct wavelengths is used to measure temperature and strain simultaneously. This system works well provided the strain is primarily in the longitudinal direction along the length of the optical fiber. If transverse strains are also involved then errors in the longitudinal strain may result. In U.S. patent application Ser. No. 08/438,025 Eric Udd describes the use of dual overlaid fiber gratings written at two distinct wavelengths into birefringent fiber that may be polarization preserving fiber to generate four equations in four unknowns to enable the measurement of four environmental parameters such as all three axes of strain and temperature. These sensors may be separated sufficiently in wavelength that multiple three axis strain and temperature sensors may be multiplexed along a single optical fiber.

In the present invention means to enhance the transverse strain sensitivity fiber gratings sensors is decribed using geometrically shaped fibers. Means are also described for low cost, effective demodulation systems that may be used to measure environmental effects acting upon fiber gratings and etalons. The first means involves using ratiometric techniques in combination with refererence etalons and fiber gratings. The second means involves using an interference pattern imaged onto an optical detector array that is obtained from light reflected from a two mirror etalon or fiber grating through a coupler and two output fibers.

Therefore it is an object of the invention to provide low cost fiber grating and etalon sensor demodulation systems.

Another object of the invention is to provide multiparmeter fiber grating sensors that are shaped for optimum sensitivity and ease of handling.

Another object of the invention is to provide a sensor demodulation system that can support multiparameter sensing at a single point.

Another object of the invention is to provide multiplexed fiber grating and etalon sensors along a single optical fiber.

Another object of the invention is to provide an all solid state low cost demodulation system for fiber grating and etalon sensors.

These and other objects and advantages of the present invention will become apparent to those skilled in the art after considering the following detailed specifications and the accompanying sheets of drawings wherein:

DETAILED DESCRIPTION OF THE SHOWN EMBODIMENTS

Figure 1:
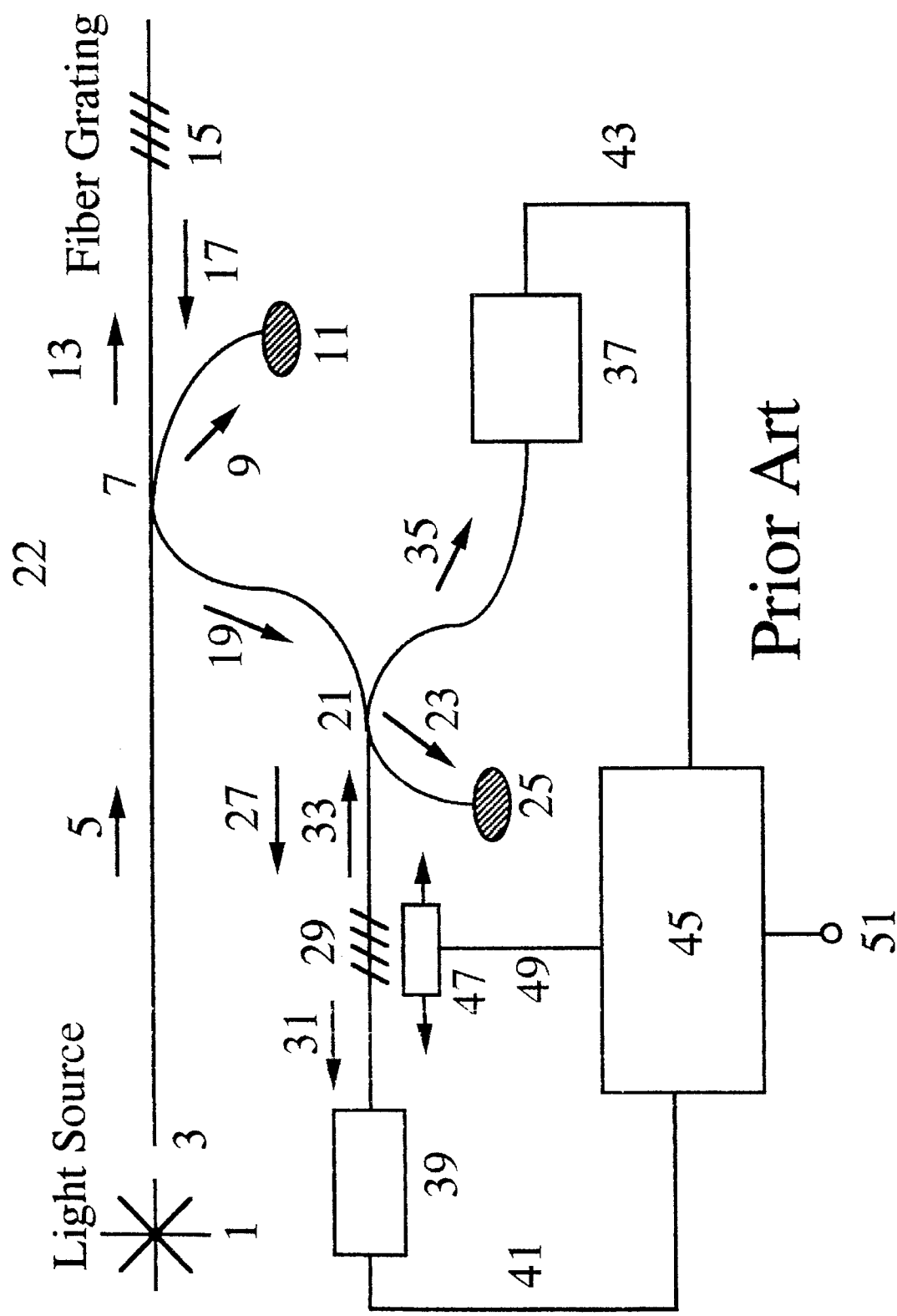
FIG. 1 is a diagram illustrating the layout of a ratiometric fiber optic grating demdodulator using a reference fiber grating as a spectral filter.
Figure 5:
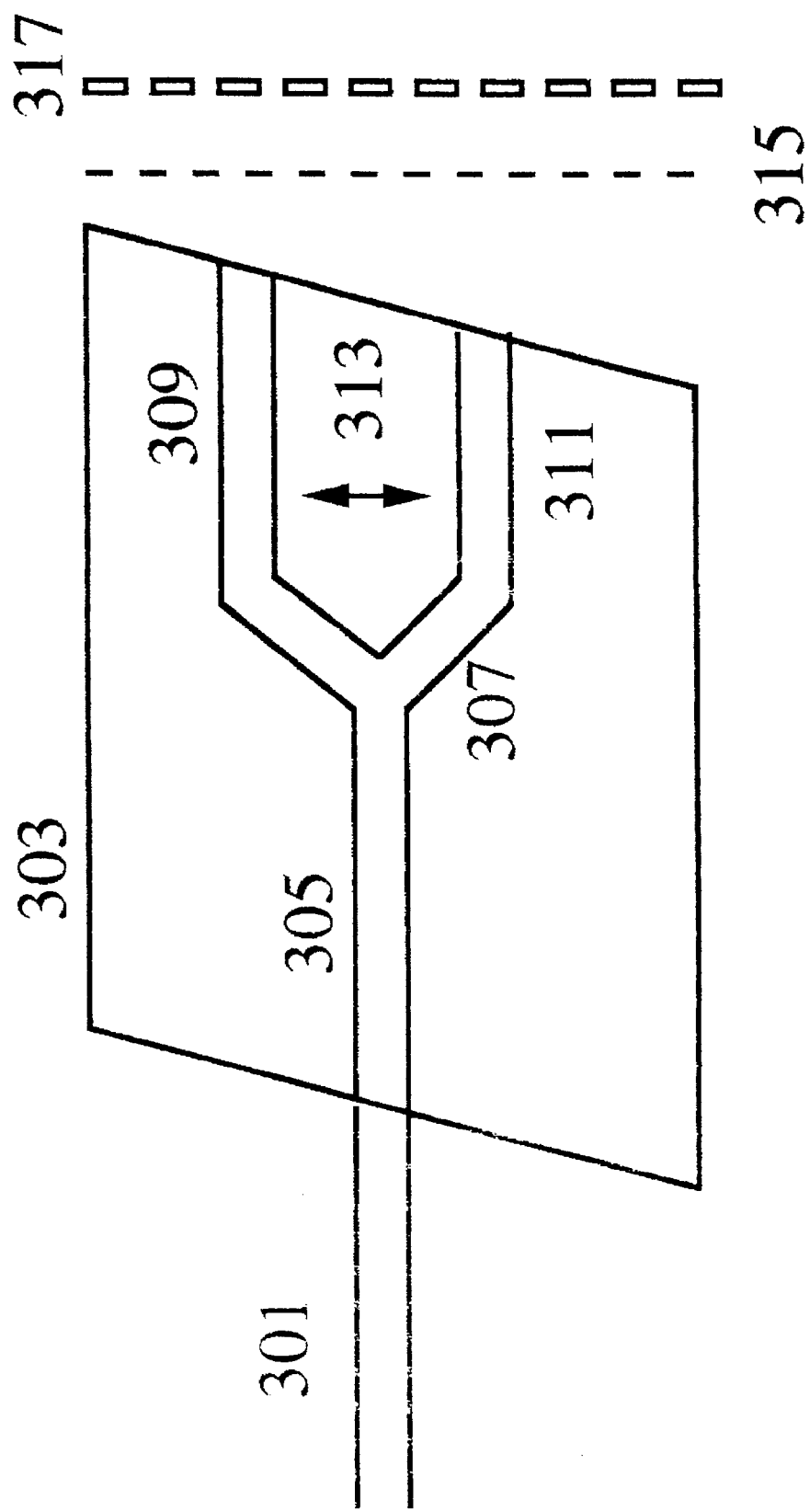
FIG. 5 is a digram illustrating the usage of an integrated optic beamsplitter and waveguides to provide an interference pattern that can be scanned by a detector array.

Referring to the drawings more particularly by reference numbers, number 22 in FIG. 1 refers to a fiber grating sensor system similar to that shown and described in association with FIG. 5 of U.S. Pat. No. 5,380,995, "Fiber Optic Grating Sensor Systems for Sensing Environmental Effects", by Eric Udd and Tim Clark. It is shown to illustrate a prior art low cost demodulation system. The light source 1 of the system 22 may be a broadband or tunable light source that couples light into the fiber end 3. The resulting light beam 5 is then directed toward the beamsplitter 7 where a portion of the light beam 7 is split into the light beam 9 and directed out of the system by the indexed matched end 11. The other light beam 13 is directed toward the fiber grating 15 which reflects back a portion of the light beam 13 as the light beam 17. The light beam 17 has a spectral content that depends upon the period of the fiber grating 15 that may be affected by environmental effects such as strain and temperature. The light beam 17 then reenters the beamsplitter 7 and a portion of the light beam 17 is split into the light beam 19 that passes the beamsplitter 21. A portion of the light beam 19 is split by the beamsplitter 21 into the light beam 23 that is directed out of the system by the index matched end 25. The other portion of the light beam 27 impinges upon the reference fiber optic grating 29. A portion of the light beam 27 is directed through the fiber grating 29 as the light beam 31 and a second portion of the light beam 27 is reflected off the fiber grating 29 as the light beam 33. The spectral content and amplitude of the light beams 31 and 33 will depend on the period of the fiber gratings 15 and 29. The light beam 33 then passes through the beamsplitter 21 and a portion of the light beam 33 is split into the light beam 35 that is directed into the output detector 37. The light beam 31 passes to the detector 39. The electrical outputs 41 and 43 from the detectors 39 and 37 respectively are then directed to electronic circuitry 45 that is used to ratio the outputs 41 and 43 and determine the spectral content of the fiber grating 15 relative to the reference fiber grating 29. To minimize noise the length of the reference fiber grating 29 may be modulated by the device 47 which could be electromechanical, thermal or piezoelectric at a rate determined by the electrical signal 49 generated by the electrical circuitry 45. The signals 41, 43 and 49 are then processed by the electrical circuitry 45 and result in the output 51.

Figure 2:
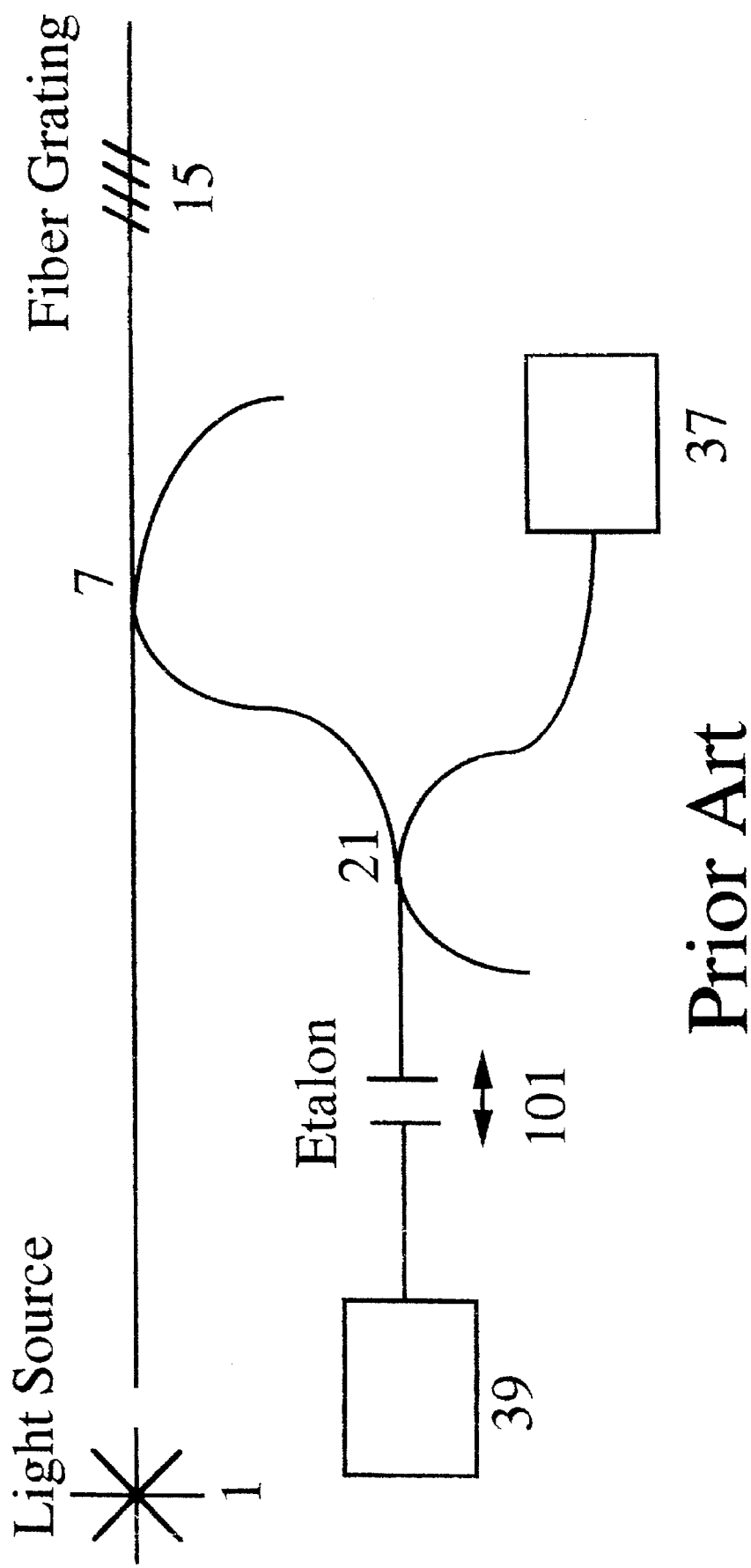
FIG. 2 is a diagram illustrating the layout of a ratiometric fiber grating demodulator using a reference fiber etalon as a spectral filter.

FIG. 2 shows a similar system to that described in association with FIG. 1 except that the reference fiber grating 29 has been replaced with the reference etalon 101. The operation of etalon based devices is described more fully in U.S. Pat. No. 5,397,891, "Sensor Systems Employing Optical Fiber Gratings", by Eric Udd and Tim Clark.

Figure 3:
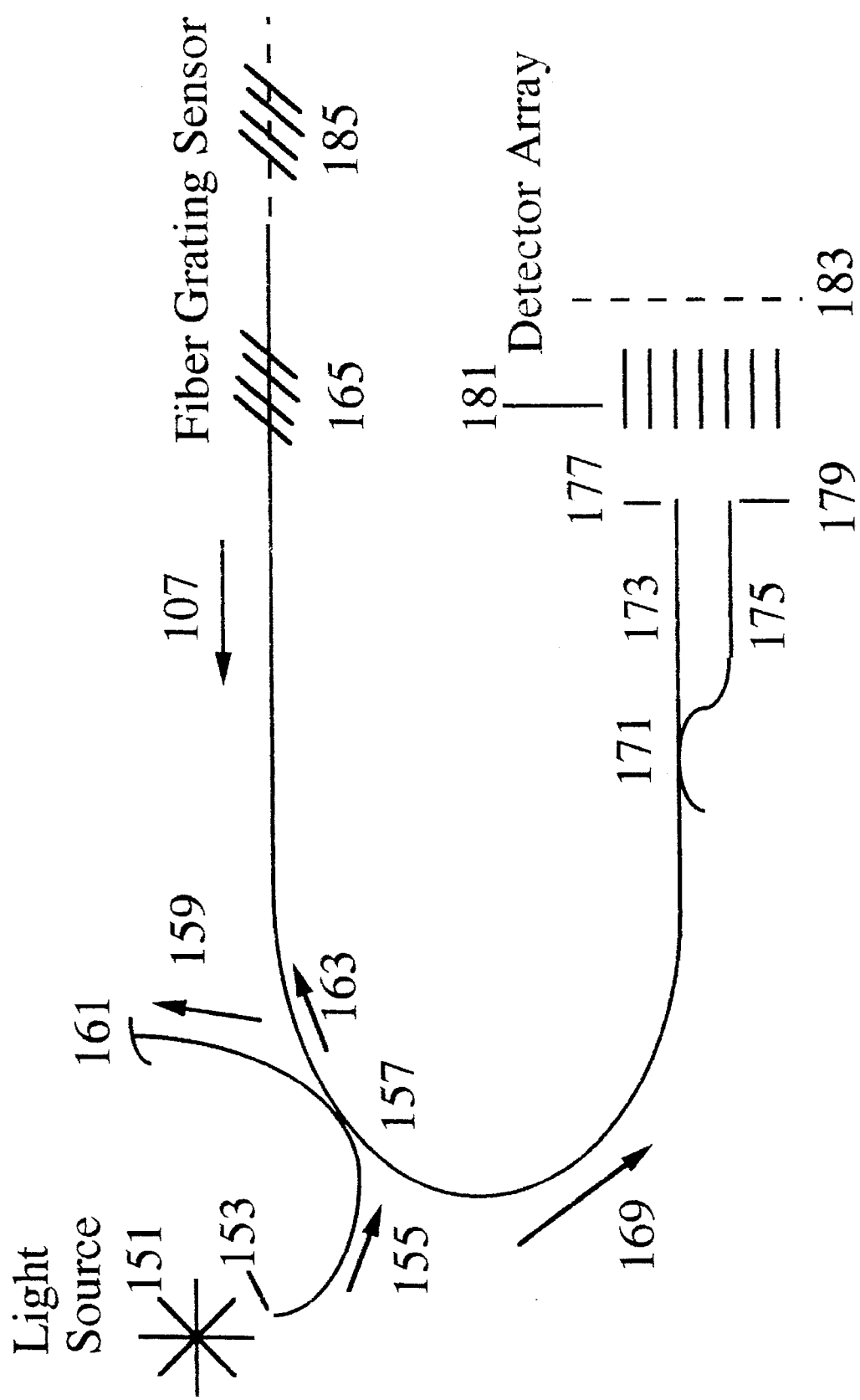
FIG. 3 is an illustration of a fiber grating demodulation system that consists of fiber coupler and dual output ends that generate an interference pattern that is imaged onto a detector array.

The systems decribed in association with FIGS. 1 and 2 have the prospect of being low cost. If they are used in conjunction with mechanical modulators such as 47 their cost is higher but performance improves since errors due to amplitude changes and 1/f noise can be reduced. There are also issues associated with moving parts and aging that can cause errors. What is needed is a true solid state demodulation system that has reduced amplitude dependence. FIG. 3 illustrates a system that accomplishes these goals. A light source 151 is used to couple light into the fiber end 153. The resultant light beam 155 propagates to the beamsplitter 157 where it is split into the light beam 159 that exits the system via the terminated end 161 and the light beam 163 that is directed toward the fiber optic grating sensor 165. A spectrally encoded light beam 167 is reflected from the fiber grating 165 and directed back to the beamsplitter 157. A portion of the light beam 167 is then split into the light beam 169 that propagates to the beamsplitter 171 and is split into the light beams 173 and 175. The light beams 173 and 175 then exit the fiber ends 177 and 179 that are spaced with respect to each other and the two beams interfere to form the interference pattern 181. The distance between the fringes depends on the wavelength of the reflected light beams 173 and 175 which in turn is determined by the period of the fiber grating 165. A periodic array of detectors 183 that may be a CCD array is placed so that the period of the interference pattern may be measured. This could be done as an example by linearly sweeping the detectors in the array 183 and measuring the spectral frequency content. It is also possible to multiplex this system with additional fiber optic gratings 185 by using time division multiplexing techniques involving pulsing the light source 151 and or by using wavelength division multiplexing techniques where the wavelengths of the fiber optic gratings 165 and 185 are sufficiently different that the interference patterns 181 that result are separable. These techniques can be used to support many more than two fiber gratings along a single fiber line.

Figure 4:
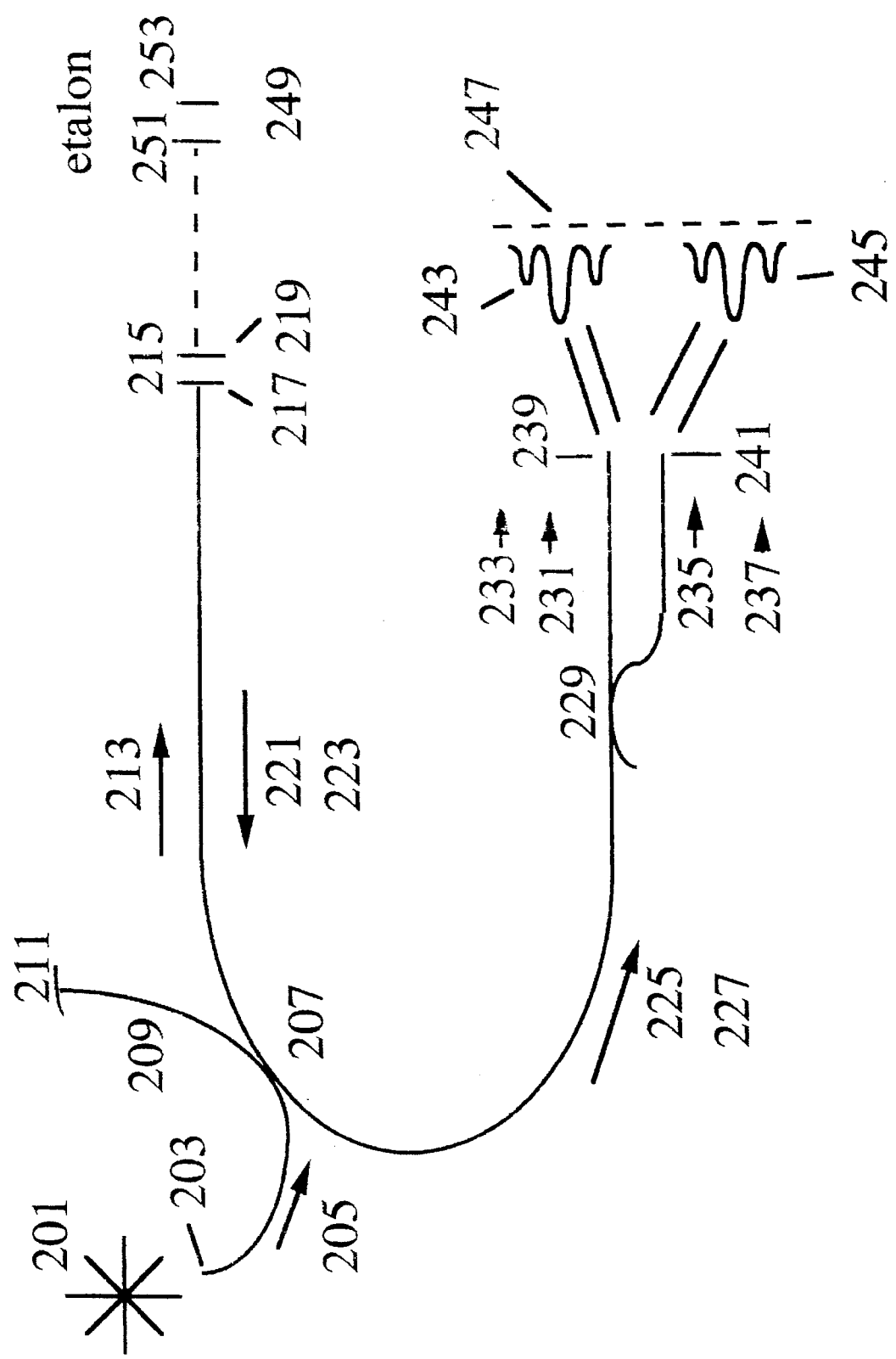
FIG. 4 is an illustration of an etalon demodulation system that consists of a fiber coupler and dual output ends that generate an interference pattern that is imaged onto a detector array.

A system that has many similarities to FIG. 3 that is used to demodulate fiber etalons is shown in FIG. 4. A light source 201 that may be a broadband low coherence length light source couples light into the fiber end 203 and generates the light beam 205. The light beam 205 is split by the beamsplitter 207 into the light beam 209 that exits the system via the terminated end 211 and the light beam 213 that is directed to the etalon 215. The etalon 215 consists of two mirrored surfaces 217 and 219 that may be internal or external to the optical fiber. The separation between the two mirrors 217 and 219 is adjusted so that it exceeds the coherence length of the light source 201. The reflected beams 221 and 223 from the mirrors 217 and 219 respectively, propagate back to the beamsplitter 207 and a portion of these light beams 225 and 227 are directed to the beamsplitter 229. This results in the four light beams 231, 233, 235 and 237 exiting the spaced fiber ends 239 and 241. The light beams 231, 233, 235 and 237 will interfere with each other and cause the interference patterns 243 and 245 when they mix with spatial separation on the order of the coherence length of the light source or less. Higher order effects may also occur but these will be with lower definition of the interference pattern. The position of the resulting interference patterns 243 and 245 on the detector array 247 that may be a CCD array can then be used to determine the separation between the mirrors 217 and 219 which in turn can be used to measure environmental effects. The demodulator system of FIG. 4 may also be used to support multiple fiber etalon sensors. A second etalon 249 with mirrors 251 and 253 may be placed in line. Time division multiplexing techniques involving pulsing the light source may be used to separate out the etalons 215 and 249. Alternatively the separation of the mirrors 251 and 253 of the second etalon 249 may be chosen to be different from the separation of the mirrors 217 and 219 by multiple coherence lengths of the light source 201. In this case a second set of spaced interference patterns similar to 243 and 245 will appear on the detector array 247 and allow both etalons 21 5 and 249 to be demodulated simultaneously.

The beamsplitter used in the demodulation systems described in association with FIGS. 3 and 4 could be an integrated optical device as shown in FIG. 5. Here an optical fiber 301 is aligned to an integrated optic device 303 so that light is coupled into the waveguide 305. The light is split at the Y junction 307 into the waveguides 309 and 311 separated by a distance 313. When the two light beams combine they will form an interference pattern 315 that may be imaged onto the detector array 317 to determine the period of the interference pattern. The advantage of this approach is that assembly is potentially greatly simplified.

Figure 6A:
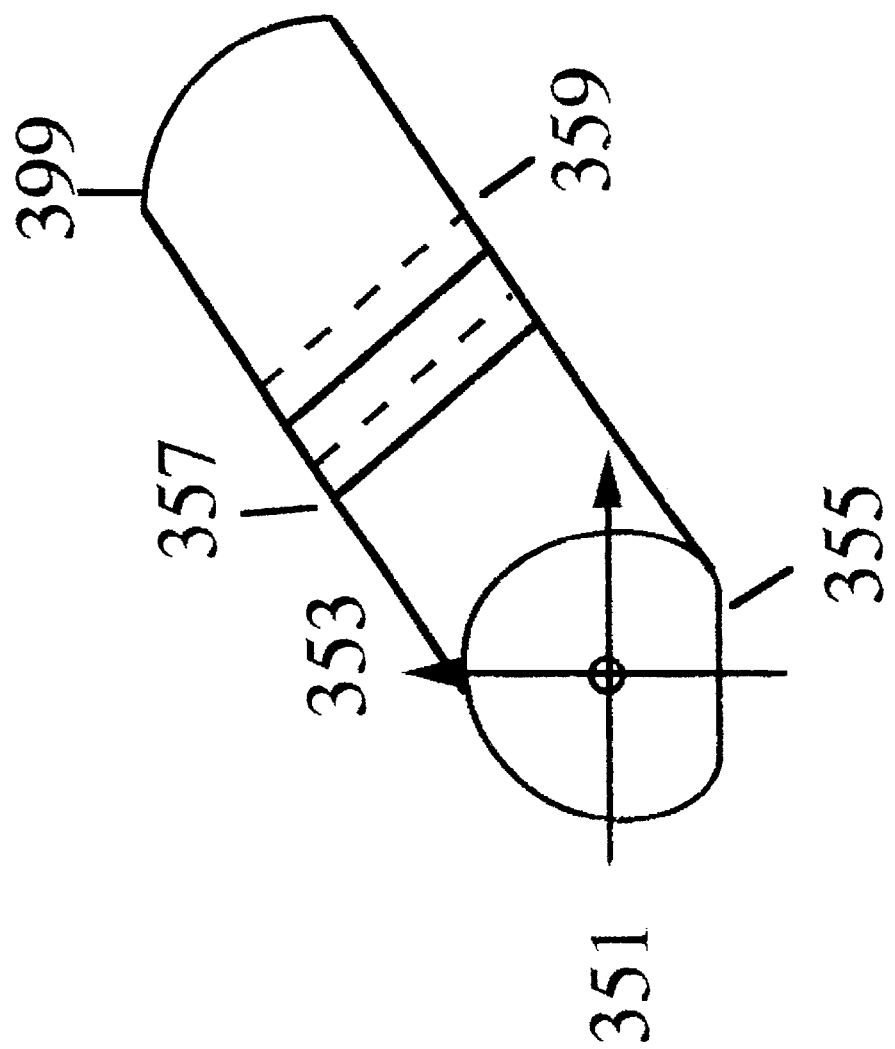
FIG. 6 is an illustration of geometrically shaped optical fibers designed to enhance transverse strain sensitivity and for ease of handling during installation.
Figure 6B:
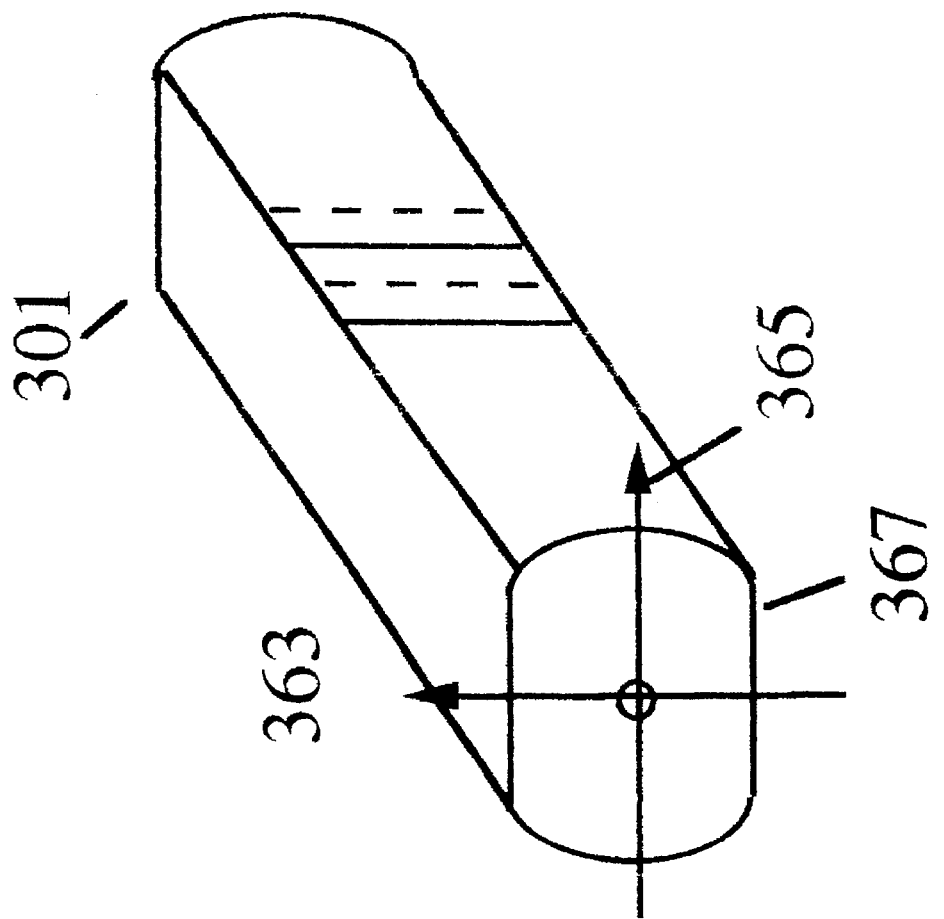

One of the great potential advantages of fiber optic grating based sensor systems is that they have the ability to sense more than one environmental effect. In U.S. Pat. No. 5,380, 995, Udd et. al. teach how dual overlaid fiber optic gratings can be used to measure strain and temperature. In U.S. patent application Ser. No. 08/438,025, Udd teaches how dual overlaid fiber optic gratings written onto birefringent optical fiber that may be polarization preserving fiber generate four effective fiber gratings. This result allows the measurement of transverse strain as well as longitudinal strain and temperature. One issue associated with using the dual overlaid fiber gratings written into polarization preserving fiber to measure transverse strain is the identification of the sensing axis of the fiber gratings. This can be overcome by using geometrically shaped optical fibers as are shown in FIG. 6. FIG. 6a shows a D shaped fiber 399 that is manufactured and marketed by Andrew Corporation. The preferred polarization axes 351 and 353 of this polarization preserving fiber are aligned parallel and perpendicular to the flat surface 355. By writing the fiber gratings 357 and 359 onto the fiber 399 four effective fiber gratings result as each polarization axis 351 and 353 has a different effective index of refraction. FIG. 6b shows a polarization preserving fiber 361 that was first made by ATT. The polarization axes 363 and 365 are again aligned parallel and perpendicular to the flat surface 367.

Figure 7:
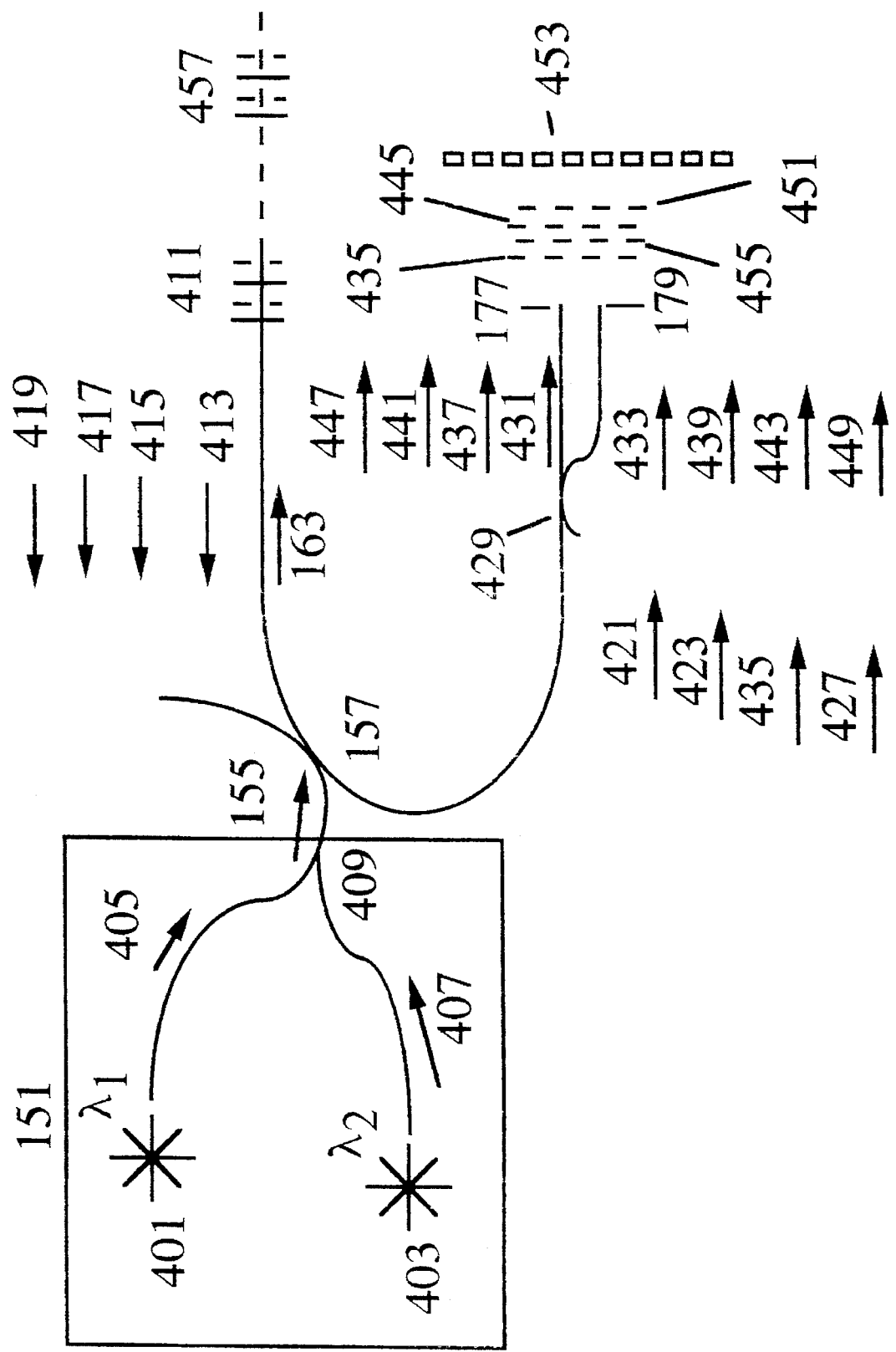
FIG. 7 illustrates a demodulation system for dual overlaid fiber optic gratings using an interference pattern imaged onto a detector array.

A system similar to that shown in FIG. 3 may be used to demodulate this type of fiber grating sensor and is shown in FIG. 7. Here the light source 151 consists of light sources 401 and 403 whose light outputs 405 and 407 are at the wavelengths $\lambda_1$ and $\lambda_2$ respectively. The light beams are combined by the wavelength division mulitplexing element 409 into the light beam 155. When the light beam 163 impinges on the dual overlaid fiber grating written onto birefringent fiber 411 four light beams are reflected 413, 415, 417 and 419 corresponding to the four effective fiber gratings. These light beams are split by the beamsplitter into the light beams 421, 423, 425 and 427. The light beam 421 is split by the beamsplitter 429 into the light beams 431 and 433 which exit the ends 177 and 179 and form the interference pattern 435. Similarly the light beam 422 is split into the light beams 437 and 439 and interfere to form the interference pattern 455. The light beam 425 is split into the light beams 441 and 443 to form the interference pattern 445. The light beam 427 is split into the light beams 447 and 449 to form the interference pattern 451. All the interference patterns 435, 439, 445 and 451 fall onto the detector array 453. The array 453 can be scanned to determine the spatial frequency of the interference patterns and used to measure the output of the dual overlaid fiber grating sensor written onto birefringent fiber 411. Additional dual overlaid fiber grating sensors such as 457 may be supported by using time and wavelength division multiplexing techniques.

It is also possible to use spectrally scanned elements in demodulators to support dual overlaid fiber grating sensors written onto polarization preserving fiber. In U.S. Pat. No. 5,397,891, "Sensor Systems Employing Optical Fiber Gratings", by Udd et. al. similar systems are described using fiber etalons and acoutooptic devices. The major advantages of the system described in association with FIG. 7 are that it has the potential to be simpler and lower in cost.

Thus there has been shown and described novel fiber grating and etalon sensor systems which fufill all of the objects and advantages sought therefor. Many changes, modifications, alterations and other uses and applications which do not depart from the spirit and scope of the invention are deemed to be covered by the invention which is limited only by the claims which follow.

What is claimed is:

1. A sensor system to sense one or more environmental effects, said system including:

a light source producing a first light beam;

a first beamsplitter positioned to receive said first beam of light and to direct a second beam of light to a fiber sensor;

a second beamsplitter connected to said first beamsplitter positioned to receive a third beam of light generated by reflection of a portion of said second beam of light from said fiber sensor;

two spaced ends of said second beamsplitter arranged to generate an interference pattern from said third light beam and first detector array means positioned to measure said interference pattern.

2. The sensor system as defined in claim 1 and further including:

one or more fiber sensors that are fiber gratings.

3. The sensor system as defined in claim 1 and further including:

one or more fiber sensors that are etalons.

4. The sensor system as defined in claim 1 and further including:

said second beamsplitter being an integrated optical waveguide.

5. The sensor system as defined in claim 1 and further including:

said second beamsplitter being a fiber optic beamsplitter.

6. The sensor system as defined in claim 1 and further including:

said first detector array being a CCD array.

7. The sensor system as defined in claim 1 and further including:

electronic means to scan said first detector array.

8. A fiber sensor system to sense one or more environmental effects said system including:

a light source producing a first light beam;

a first beamsplitter with at least three ports with the first port being positioned to receive said first light beam;

the second port of said first beamsplitter being connected to one or more fiber sensors;

the third port of said first beamsplitter being connected to a first port of a second beamsplitter with at least three ports;

the second and third port of said second beamsplitter being spaced with respect to each other so that light entering said first port may when passing through said second and third port results in an interference pattern; and a first optical detector array means positioned to measure said interference pattern.

9. The sensor system as defined in claim 8 and further including:

said fiber sensors being fiber gratings.

10. The sensor system as defined in claim 8 and further including:

said fiber sensors being etalons.

11. The sensor system as defined in claim 8 and further including:

said light source being comprised of multiple light sources at different wavelengths that are wavelength division multiplexed.

12. The sensor system as defined in claim 8 and further including:

where said fiber sensors are dual overlaid fiber gratings.

* * * * *